United States Patent
Tang

(10) Patent No.: US 8,898,155 B2
(45) Date of Patent: Nov. 25, 2014

(54) PERSONALIZED META-SEARCH METHOD AND APPLICATION TERMINAL THEREOF

(75) Inventor: Juan Tang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 132 days.

(21) Appl. No.: 13/702,740

(22) PCT Filed: Dec. 24, 2010

(86) PCT No.: PCT/CN2010/080235
§ 371 (c)(1),
(2), (4) Date: Dec. 7, 2012

(87) PCT Pub. No.: WO2011/153807
PCT Pub. Date: Dec. 15, 2011

(65) Prior Publication Data
US 2013/0086053 A1    Apr. 4, 2013

(30) Foreign Application Priority Data

Jun. 11, 2010  (CN) .............................. 201010200736

(51) Int. Cl.
*G06F 17/30* (2006.01)
(52) U.S. Cl.
CPC .... *G06F 17/30554* (2013.01); *G06F 17/30867* (2013.01)
USPC .......... 707/723; 707/732; 707/748; 705/14.7; 705/14.5; 455/435.1

(58) Field of Classification Search
CPC ................... G06F 17/30554; G06F 17/30867; G06F 17/30; G06F 17/30864; G06F 17/30675; G06F 17/30696; G06F 17/30749; G06F 17/30991; G06F 17/3053; G06Q 10/10; G06Q 30/02
USPC ......... 707/723, 732, 733, 722, 767, 769, 748, 707/E17.014, E17.008, E17.109; 705/14.7, 705/14.5, 7.18; 455/435.1; 709/204
See application file for complete search history.

(56) References Cited

U.S. PATENT DOCUMENTS 6,647,383 B1 *  11/2003  August et al. ......... 707/E17.109
6,725,227 B1 *  4/2004  Li ......................... 707/E17.114
(Continued)

FOREIGN PATENT DOCUMENTS

CN         1389811 A       1/2003
CN       101080709 A      11/2007
(Continued)

OTHER PUBLICATIONS

M Koorangi, K Zamanifar—International Journal of Computer Science and Network Security (IJCSNS), vol. 7, No. 1, Jan. 2007—paper.ijcsns.org—"A distributed agent based web search using a genetic algorithm" pp. 65-76.*

(Continued)

*Primary Examiner* — Anh Ly
(74) *Attorney, Agent, or Firm* — Oppedahl Patent Law Firm LLC

(57) ABSTRACT

The disclosure discloses a personalized meta-search method, which comprises: preestablishing an interest database; searching a keyword; extracting a use log of the keyword from the interest database; preprocessing search results returned from a search engine; calculating, by using the use log, interests of the preprocessed search results and of Uniform Resource Locators (URLs) in the interest database corresponding to the searched keyword; ranking, based on calculated results, and displaying the preprocessed search results and the URLs; updating the interest database. An application terminal for personalized meta-search is also disclosed. The method and the application terminal enable users to obtain more targeted and more satisfactory search results, thereof improving user experience.

10 Claims, 2 Drawing Sheets

(56) References Cited

U.S. PATENT DOCUMENTS

| | | | |
|---|---|---|---|
| 2002/0013729 A1* | 1/2002 | Kida | 705/14 |
| 2002/0062223 A1* | 5/2002 | Waugh | 705/1 |
| 2005/0044078 A1* | 2/2005 | deVries et al. | 707/9 |
| 2006/0041615 A1* | 2/2006 | Blank et al. | 709/204 |
| 2007/0083428 A1* | 4/2007 | Goldstein | 705/14 |
| 2007/0143260 A1 | 6/2007 | Markov et al. | |
| 2007/0250500 A1* | 10/2007 | Ismalon | 707/5 |
| 2007/0281690 A1* | 12/2007 | Altman et al. | 455/435.1 |
| 2008/0109422 A1* | 5/2008 | Dedhia | 707/5 |
| 2008/0221987 A1* | 9/2008 | Sundaresan et al. | 705/14 |
| 2008/0281687 A1* | 11/2008 | Hurwitz et al. | 705/14 |
| 2009/0299853 A1* | 12/2009 | Jones et al. | 705/14.46 |
| 2010/0306249 A1* | 12/2010 | Hill et al. | 707/769 |
| 2011/0035401 A1* | 2/2011 | Nye | 707/769 |
| 2011/0161130 A1* | 6/2011 | Whalin et al. | 705/7.18 |
| 2013/0304721 A1* | 11/2013 | Fakeih | 707/710 |

FOREIGN PATENT DOCUMENTS

| | | |
|---|---|---|
| CN | 101341484 A | 1/2009 |
| CN | 101477554 A | 7/2009 |
| CN | 101661474 A | 3/2010 |
| CN | 101853308 A | 10/2010 |

OTHER PUBLICATIONS

Woncheol Kim, Eenjun Hwang and Wonil Kim—"Reorganizing New Pages for Mobile Users"—Computer Science vol. 2902 2003, (pp. 229-243).*

International Search Report in international application number: PCT/CN2010/080235. mailed on Mar. 31, 2011.

English Translation of the Written Opinion of the International Search Authority in international application number: PCT/CN2010/080235, mailed on Mar. 31, 2011.

* cited by examiner

PERSONALIZED META-SEARCH METHOD AND APPLICATION TERMINAL THEREOF

TECHNICAL FIELD

The disclosure relates to a search engine optimization technique, particularly to a personalized meta-search method and an application terminal thereof.

BACKGROUND

With the continuous development of Internet technologies, search engines mostly tend to become more and more personalized and intellectualized. Basically, personalized search improves the search efficiency for a user by tracing and analyzing search behaviors of the user while intellectualized search mainly comprehends and analyzes information of search demands by a search engine, and utilizes the self-adaptive ability and the self-adjusting ability of the search engine to provide more satisfactory search results for the user. However, the existing search engines, which mainly apply a keyword as the retrieval basis, complete the retrieval process by retrieving a webpage indexing database and returning the results. This method has very apparent limitations. The keyword technique can hardly express the retrieval intention of the user clearly, and the search engines fail to better comprehend the input information of natural languages, e.g., if a user wants to learn the composition of the Android framework, the intention of the user cannot be expressed clearly even if "Android framework" or "framework composition" etc. is inputted. If the user inputs "composition of the Android framework" which clearly expresses, however, the search engine will only return related websites associated with such keyword as "Android", "framework" or "composition" etc. On the other hand, typically, millions of documents will be returned by querying one or several simple keywords. In this case, the user can hardly find the necessary information which the user is interested in. In order to solve these limitations, currently there are extensive researches, one of which is meta-search engine. A meta-search engine, like a filter channel, takes the output results of independent search engines as input, rearranges the output results by meta-search techniques such as integration, invocation, control and optimization etc., and presents the final results to the user to provide a real-time response for the user.

At present, personalized search services based on the interest of the user have not been realized in the field of mobile terminals. Taking the open-source mobile phone operation system Android platform issued by Google as an example, searching is basically realized by directly invoking the search engine in the browser. In order to facilitate searching, the search suggestion technique of Google is used largely, which mainly provides the most popular correlated search suggestions, as well as the history search suggestions etc. queried by the user. However, personalized search schemes has not been realized based on the characteristics that a mobile terminal is used by a specific user generally, and that a great amount of data which the user is interested in is included in each mobile terminal.

SUMMARY

In view of this, the main objective of the disclosure is to provide a personalized meta-search method and an application terminal thereof, thus the arranged, searched and obtained results are more targeted, and the needs of users can be met better.

In order to achieve the objective above, the technical solution of the disclosure is realized as follows.

The disclosure provides a personalized meta-search method, which comprises:
preestablishing an interest database, and further comprising:
searching a keyword;
extracting a use log of the keyword from the interest database;
preprocessing search results returned from a search engine;
calculating, by using the use log, interests of the preprocessed search results and of Uniform Resource Locators (URLs) in the interest database corresponding to the searched keyword;
ranking, based on calculated results, and displaying the preprocessed search results and the URLs; and
updating the interest database.

The method may further comprise: before searching the keyword, when a user inputs the keyword, obtaining, by using an interest database, and presenting a ranked search suggestion list to the user.

The preestablishing the interest database may comprise: establishing the interest database based on interest information inputted by the user and in connection with searched out related URLs.

The interest database may comprise: an interest list and a use log list, wherein
the interest list comprises: the keyword, the URLs associated with the keyword, and interests corresponding to the URLs;
the use log list comprises: a user identity, the keyword, the URLs associated with the keyword, dates on which the URLs are used, start time and end time associated with opening of the URLs.

Parameters for interest calculation may comprise at least one of:
inclusion of the searched keyword in keywords associated with the URLs;
location of the searched keyword in link of the URLs;
history times of clicking the URLs by users; history time periods for browsing the URLs by users; and
history clicking sequence of the URLs by users.

The updating the interest database may comprise at least one of: performing the ranking based on the calculated interests, selecting at least one keyword with a highest similarity to store the keyword and its URLs and interest in the interest database, and updating data in the use log according to operations of the user.

The disclosure further provides an application terminal for personalized meta-search, which comprises: a search processing unit, an interest database unit, an interface unit, an interest database initial setting unit, wherein
the search processing unit is configured to extract a use log of a searched keyword from the interest database unit, to obtain search results from the interface unit and perform preprocessing, to calculate interests of the preprocessed search results and of the extracted URLs in the interest database corresponding to the searched keyword by using the use log, and to rank, based on the calculated results, and display the preprocessed search results and the extracted URLs;
the interest database unit is configured to store the use log and personal interest information of users, and URLs and interests to which the personal interest information is mapped, and to be updatable by the search processing unit;
the interface unit is configured to provide the search processing unit with an interface for connecting to a search engine and obtaining search results; and the interest database initial setting unit is configured to store interest database information into the interest database unit.

The search processing unit may be further configured to obtain, by using data in the interest database, and display a ranked search suggestion list to the user, when the user inputs the keyword.

The interest database unit may further comprise: an interest list sub-unit and a use log sub-unit, wherein the interest list sub-unit is configured to store personal interest information and URLs and interests to which the personal interest information is mapped and to be updatable by the search processing unit; and the use log sub-unit is configured to store a user identity, the keyword, the URLs associated with the keyword, dates on which the URLs are used, start time and end time associated with opening of the URLs.

Parameters for calculating the interests by the search processing unit may comprise at least one of:

inclusion of the searched keyword in keywords associated with the URLs;

location of the searched keyword in link of the URLs;

history times of clicking the URLs by users; history time periods for browsing the URLs by users; and history clicking sequence of the URLs by users.

The method and application terminal thereof in the disclosure are able to search a keyword; extract a use log of the keyword from the interest database; preprocess search results returned from a search engine; calculate, by using the use log, interests of the preprocessed search results and of Uniform Resource Locators (URLs) in the interest database corresponding to the searched keyword; rank, based on calculated results, and display the preprocessed search results and the URLs; and update the interest database; thus enabling users to obtain more targeted and more satisfactory search results, and improve user experience.

For an Android platform, a convenient application interface is provided to facilitate third party software developers to integrate their personalized search with other application programs, thus providing maximum convenience for this disclosure to realize personalized suggestion services and personalized output search results.

DETAILED DESCRIPTION

The basic idea of the disclosure is as follows: preestablishing an interest database; searching a keyword; extracting a use log of the keyword from the interest database; preprocessing search results returned from a search engine; by using the use log, calculating interests of the preprocessed search results and of Uniform Resource Locators (URLs) in the interest database corresponding to the searched keyword; ranking, based on calculated results, and displaying the preprocessed search results and the URLs; updating the interest database.

The technical solution of the disclosure is described below with reference to the drawings and embodiments in details.

Figure 1:
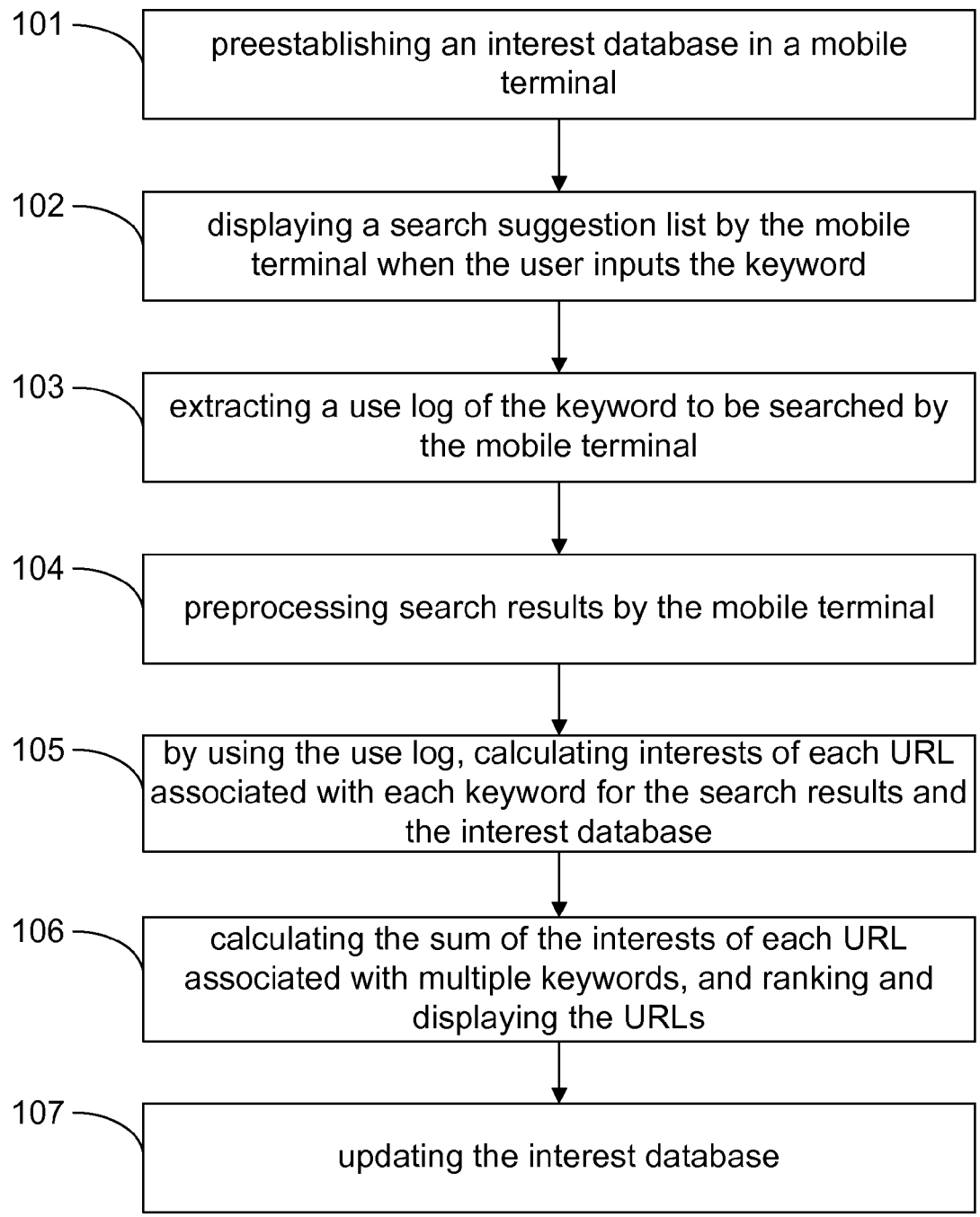
FIG. 1 is a flowchart illustrating a personalized meta-search method for a mobile terminal in the disclosure.

FIG. 1 is a flowchart illustrating a personalized meta-search method for a mobile terminal in the disclosure. As shown in FIG. 1, the personalized meta-search method specifically comprises the following steps.

Step 101: preestablishing an interest database in a mobile terminal;

specifically, one mobile terminal is used by a specific user generally. Therefore, the user can establish the interest database in the mobile terminal. The establishment of the interest database specifically comprises the following steps:

Step 101a: inputting personal interest information by the user;

specifically, the user inputs the personal interest information via a human-machine interface. The personal interest information comprises: information which the user is interested in such as the job title of the user, nature of work, interest and hobbies etc.;

Step 101b: returning related URL(s) by a search engine based on the inputting of the user;

specifically, each time when the user inputs the personal interest information, the keyword is searched on a search engine of a search interface provided by an operation system of the mobile terminal, e.g., the URL containing the keyword are acquired from the Google search by an interface provided by an Android system;

Step 101c: storing one or more searched URLs, interest information and a mapping relationship thereof in the interest database.

Specifically, based on the sequence of the URLs returned by the search engine, a certain amount of the URLs can be selected and stored contents associated with the inputted keyword. Preferably, one or more URLs which the user is interested in can be selected by the user and stored as the contents associated with the keyword. The URLs stored in the interest database are stored in an interest list as an Integrated Data Base (IDB) structure by means of mapping list, e.g., the IDB structure is about the mapping relationship of the keyword and the URLs. In the interest list, the corresponding relationship of the keyword and the URLs can be as follows: one keyword corresponds to one URL, or one keyword corresponds to a plurality of URLs, or a plurality of URLs corresponds to one keyword, or a plurality of keywords corresponds to a plurality of URLs. At the same time, interest parameters are stored in each URL associated with each keyword. In the initial conditions, default interests are 0. The interests can be updated based on search habits of the user.

Further, the interest database also comprises a use log list, in which use data of the user is stored, and the use log list specifically comprises: date on which the user clicks the URLs associated with each keyword, start time associated with opening the link, end time associated with closing the link, and interests.

Further, the interest list in the interest database established by the user initially has the highest priority in the search method of the disclosure, and is stored in the interest database all the same unless the user intentionally modifies the interest list.

Step 102: when the user inputs the keyword, the mobile terminal obtains data of the interest list from the interest database through an interface provided by an operation system, obtains and presents a ranked search suggestion list to the user;

specifically, when the user inputs the keyword to be searched through a human-machine interface, the mobile terminal matches the inputted keyword based on information stored in the interest list in the interest database, and obtains one or more keywords or key terms which are the most relevant. The higher the sum of the interests of a plurality of URLs associated with each keyword or each key term is, the higher the sequence recommended in the search suggestion list is. Table 1 is an interest list corresponding to a keyword and URLs stored in an interest database of the disclosure. As shown in Table 1, the sum of the interests of keyword1 is 10; the sum of the interests of keyword2 is 9; the sum of the interests of keyword3 is 7; and the sum of the interests of keyword4 is 9. In this case, a ranked search suggestion list is: keyword1, keyword2, keyword4, and keyword3. What needs to be explained is that the interest in Table 1 is accumulated and obtained after being used for a period of time by the user. The specific interest calculation method is described in details in subsequent steps.

TABLE 1

|       | keyword1 | keyword2 | keyword3 | keyword4 |
|-------|----------|----------|----------|----------|
| URL1  | 4        | 2        | 1        | 1        |
| URL 2 | 1        | 2        | 4        | 4        |
| URL 3 | 4        | 1        | 1        | 3        |
| URL 4 | 1        | 4        | 1        | 1        |

Further, since a plurality of keywords or key terms may be matched to the inputted keyword, the number of the keywords displayed and recommended in the search suggestion list can be set flexibly based on the display performance of the mobile terminal or the habits of the user.

Step 103: once searching, the mobile terminal extracts a use log of the keyword based on the keyword which are confirmed to be searched;

specifically, after inputting the keyword to be searched, the user performs searching, and besides searching, the user further needs to, based on the keyword, extract the use log of the keyword stored in the interest database. The extracted contents may comprise: the user ID, the URLs, date, start time, end time, the keyword and interests.

Step 104: after the searching, the mobile terminal obtains search results returned by the search engine and preprocesses the returned results;

specifically, the results returned by the search engine comprise: the user ID, the keyword, titles, the URLs and snippets, wherein the titles refer to titles of the contents of the URLs returned after searching; the snippets are abbreviated abstracts of the contents of the URLs returned after searching. The preprocessing comprises: words cutting, words segmentation, and removal of stop words to express the titles and the snippets as sets of words.

Step 105: by using the use log, the mobile terminal calculates the returned and preprocessed search results and the URLs associated with the searched keyword in the interest database, and obtains an interest I (URLi, keywordj) of each URL associated with the keyword;

specifically, the calculation procedure comprises the following steps:

Step 105a: calculating based on the situation whether or not keywords associated with the URLi contain the searched keyword;

specifically, a parameter δ is used in the disclosure for measurement. For the URLi, if the keywordj contains the searched keyword, then $I_1$ (URLi, keywordj)=δ; otherwise, $I_1$ (URLi, keywordj)=0.

Step 105b: calculating based on the situation whether or not the title, and/or snippet of the URLi can contain the searched keyword;

specifically, the disclosure uses parameters ζ and η to measure the importance. For the URLi, if the title (or snippet) contains the searched keyword, $I_2$ (URLi, keywordj)=ζ (or η); otherwise, $I_2$ (URLi, keywordj)=0.

Step 105c: calculating based on the history times of clicking the URLs by users;

specifically, the more the URL is clicked by the user, the higher the interest is. The times of clicking the URLs can be obtained based on the start time in the use log. The disclosure uses a parameter α to measure the clicking, e.g., if the URL1 is clicked by the user for 5 times, then the interest is 5α. For the keywordj, if the times of clicking the URL1 is n which is an integer, then $I_3$ (URLi, keywordj)=nα; otherwise, $I_3$ (URLi, keywordj)=0.

Step 105d: calculating based on the history time periods for browsing the URLs;

specifically, a parameter β is used in the disclosure to measure the time similarly. The longer the URL is browsed by the user, the higher the interest is. The browsing time periods can be obtained through the start time and the end time in the use log. For the keywordj, if the time for browsing the URLi by the user is m sec, then $I_4$ (URLi, keywordj)=mβ; otherwise, $I_4$ (URLi, keywordj)=0.

Step 105e: calculating based on the clicking sequence of the URLs by users;

specifically, for those identical keywords, the user will be interested in website a, and then website b and finally website c. The interest of website a should be higher than that of website b, and the interest of website b should be higher than that of website c. An attenuation factor γ is used in the disclosure. For the keywordj, URLa→URLb→URLc, then I(URLb, keywordj)=γI (URLa, keywordj); I(URLc, keywordj)=γI (URLb, keywordj).

What needs to be further explained is that the interest I I (URLi, keywordj) is the sum of $I_1$, $I_2$, $I_3$ and $I_4$ in steps 105a to 105d, i.e., I(URLi, keywordj)=$I_1+I_2+I_3+I_4$, and $I_5$ is optionally used to improve the interest, wherein the value of each parameter is not limited to a specific one and belongs to [0, 1]. More importantly, δ>ζ>η; it will be seen from this that the situation that the keywords associated with the URLi contain the searched keyword has the greatest weight, and the situation that the title of the URLi contains the searched keyword has the second greatest weight, and the situation that the snippet of the URLi contains the searched keyword has the least weight.

Step 106: calculating the sum of the interests of each URL associated with multiple keywords which are most correlated, ranking and displaying the URLs;

Step 107: updating the interest database.

Specifically, since the structure of the interest list is a collection of keywords, URLs and interests, the interest list can be updated directly, based on the following specific method: performing the ranking based on the interests, selecting at least one keyword with a highest similarity to store the keyword and its URLs and interests in the interest list. The number of the selected keyword with the highest similarity can be set by the user based on personal use habits in combination with the performance of the mobile terminal. After the user completes operations such as clicking etc, the data in the use log list is updated based on the current operation of the user. The interest database is updated after each use to continually update and increase the data quantity in the interest database, thus the subsequent search results are more accurate and the recommended ranking can better meet the interest of the user.

Further, the calculation procedure in steps 105 to 106 will be described based on the specific examples in Table 2 to Table 6.

Firstly, the user inputs "mp3" in the human-machine interface to search, the keyword combinations related to mp3 in the interest list in the interest database comprise: (Zhang Xueyou mp3, URL1); (Wang Fei mp3, URL2), and results returned from the search interface such as (Baidu mp3, URL3); (Sougou Music, URL4). Provided that, the sequence of the keyword is (Zhang Xueyou mp3, Wang Fei mp3, Baidu mp3, Sougou Music);

corresponding to step 105a, when δ=0.9, since the first three keywords comprise "mp3", the calculated results are shown in Table 2:

TABLE 2

|  | Zhang Xueyou mp3 | Wang Fei mp3 | Baidu mp3 | Sougou Music |
|---|---|---|---|---|
| URL1 | 0.9 | 0 | 0 | 0 |
| URL2 | 0 | 0.9 | 0 | 0 |
| URL3 | 0 | 0 | 0.9 | 0 |
| URL4 | 0 | 0 | 0 | 0 |

Corresponding to step 105b, provided that the title of the URL2 contains the keyword "Wang Fei, mp3" and the snippet of URL3 contains the keywords "Baidu mp3" and "Wang Fei mp3", when ζ=0.6, the value η=0.4, the calculated results are shown in Table 3:

TABLE 3

|  | Zhang Xueyou mp3 | Wang Fei mp3 | Baidu mp3 | Sougou Music |
|---|---|---|---|---|
| URL1 | 0.9 | 0 | 0 | 0 |
| URL2 | 0 | 0.9 + 0.6 | 0 | 0 |
| URL3 | 0 | 0.4 | 0.9 + 0.4 | 0 |
| URL4 | 0 | 0 | 0 | 0 |

Corresponding to step 105c, provided that the times of clicking the URL1 by the user may be 2, the times of clicking the URL2 may be 3, the times of clicking the URL3 may be 1, and the times of clicking the URL4 may be 1, when α=0.2, the calculated results are shown in Table 4:

TABLE 4

|  | Zhang Xueyou mp3 | Wang Fei mp3 | Baidu mp3 | Sougou Music |
|---|---|---|---|---|
| URL1 | 0.9 + 2 * 0.2 | 2 * 0.2 | 2 * 0.2 | 2 * 0.2 |
| URL2 | 3 * 0.2 | 0.9 + 0.6 + 3 * 0.2 | 3 * 0.2 | 3 * 0.2 |
| URL3 | 0.2 | 0.4 + 0.2 | 0.9 + 0.4 + 0.2 | 0.2 |
| URL4 | 0.2 | 0.2 | 0.2 | 0.2 |

Corresponding to step 105d, provided that the time periods for browsing the URL1 may be 10 seconds, the time periods for browsing the URL2 may be 5 seconds, the time periods for browsing the URL3 may be 3 seconds, the time periods for browsing the URL4 may be 1 second, when 13=0.02, the calculated results are shown in Table 5:

TABLE 5

|  | Zhang Xueyou mp3 | Wang Fei mp3 | Baidu mp3 | Sougou Music |
|---|---|---|---|---|
| URL1 | 0.9 + 2 * 0.2 + 10 * 0.02 | 2 * 0.2 + 10 * 0.02 | 2 * 0.2 + 10 * 0.02 | 2 * 0.2 + 10 * 0.02 |
| URL2 | 3 * 0.2 + 5 * 0.02 | 0.9 + 0.6 + 3 * 0.2 + 5 * 0.02 | 3 * 0.2 + 5 * 0.02 | 3 * 0.2 + 5 * 0.02 |
| URL3 | 0.2 + 3 * 0.02 | 0.4 + 0.2 + 3 * 0.02 | 0.9 + 0.4 + 0.2 + 3 * 0.02 | 0.2 + 3 * 0.02 |
| URL4 | 0.2 + 0.02 | 0.2 + 0.02 | 0.2 + 0.02 | 0.2 + 0.02 |

Finally, regarding the related keywords of each URL, the calculated results are shown in Table 6:

TABLE 6

|  | Zhang Xueyou mp3 | Wang Fei mp3 | Baidu mp3 | Sougou Music |
|---|---|---|---|---|
| URL1 | 1.5 | 0.6 | 0.6 | 0.6 |
| URL2 | 0.7 | 2.2 | 0.7 | 0.7 |
| URL3 | 0.26 | 0.66 | 1.56 | 0.26 |
| URL4 | 0.22 | 0.22 | 0.22 | 0.22 |

What needs to be explained is that this example does not perform the calculation based on the user clicking sequence of the URLs in step 105e. During actual applications, the interest can be calculated based on one method in steps 105a to 105e, or combinations of several methods in steps 105a to 105e based on actual conditions and needs of the user.

Corresponding to step 106, the interest of the keywords associated with the URL1 is 3.3; the interest of the keywords associated with the URL2 is 4.3; the interest of the keywords associated with the URL3 is 2.74, and the interest of the keywords associated with the URL4 is 0.88. Therefore, the ranked result is: the URL2, the URL1, the URL3, and the URL4.

Figure 2:
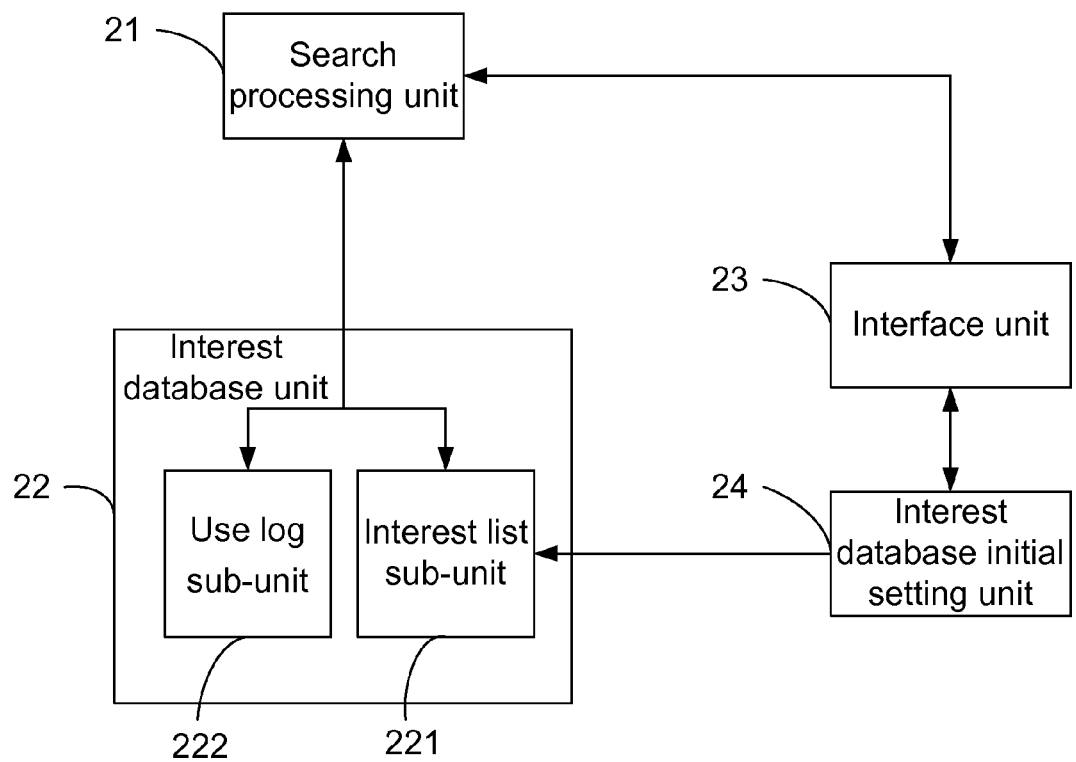
FIG. 2 is a structural diagram illustrating an application terminal for personalized meta-search in the disclosure.

FIG. 2 is a structural diagram illustrating an application terminal for personalized meta-search in the disclosure. As shown in FIG. 2, generally, the application terminal is a personal mobile terminal, and comprises: a search processing unit 21, an interest database unit 22 and an interface unit 23;

the search processing unit 21 is configured to extract a use log from the interest database unit 22, to obtain search results from the interface unit 23 and perform preprocessing, to calculate interests of the preprocessed search results and of the extracted URLs associated with the searched keyword in the interest database unit 22 by using the use log, to rank, based on the calculated results, and display the preprocessed search results and the extracted URLs; and to update the interest database unit 22;

specifically, after inputting the keyword to be searched, the user performs the searching. Besides the searching, the search processing unit 21 further needs to, based on the keyword, extract the use log of the keyword stored in the interest database unit 22. The extracted contents comprise: a user ID, the URLs, date, start time, end time, the keyword and interests. The search results comprise: the user ID, the keyword, titles, the URLs, and snippets; wherein the titles refer to titles of the contents of the URLs returned after searching; the snippets sre abbreviated abstracts of the contents of the URLs returned after searching. The preprocessing comprises: words cutting, words segmentation, and removal of stop words to express the titles and the snippet sas sets of words. The interest calculation method is as described in steps 105a to 105e. The calculation is performed based on at least one of the following conditions first: inclusion of the searched keyword in keywords associated with the URLs; location of the searched keyword in link of the URLs; history times of clicking the URLs by users; history time periods for browsing the URLs by users; and history clicking sequence of the URLs by users. Subsequently, the sum of the interests of each URL associated with multiple keywords which are most correlated is calculated; the URLs are ranked and displayed.

The interest database unit 22 is configured to store the use log and personal interest information of users, and URLs and interests to which the personal interest information is mapped, and to be updated by the search processing unit 21.

The interface unit 23 is configured to provide the search processing unit 21 with an interface for connecting a search engine and obtaining search results.

Specifically, the interface unit 23 provides an interface of a search engine on the Internet for the search processing unit 21, thus the search processing unit 21 is able to obtain the search results, calculate the interests and perform the ranking, e.g., the Google search interface provided by the Android system in the mobile terminal. The disclosure is not limited to use the Android system, all system platforms capable of providing search engine interfaces can be applied in the disclosure.

Further, the application terminal comprises: an interest database initial setting unit 24;

The interest database initial setting unit 24 is configured to receive the interest information inputted by the user, to search related the URLs via the interface unit 23, and to store related information into the interest database unit 22.

Specifically, the user inputs the personal interest information via a human-machine interface. The personal interest information comprises: information which the user is interested in such as the job title of the user, nature of work, interest and hobbies etc. Each time when the user inputs the personal interest information, the keyword is searched on a search engine in the interface unit 23 on the Internet. For the data stored in the interest database unit 22, based on the sequence of the URLs returned by the search engine, a certain amount of the URLs can be selected and stored contents correlated to the inputted keyword. Preferably, one or more URLs which the user is interested in can be selected by the user and stored as the contents correlated to the inputted keyword.

Further, the search processing unit 21 is further configured to obtain, by using data in the interest database, and display a ranked search suggestion list to the user, when the user inputs the keyword.

Specifically, when the user inputs the keyword to be searched through a human-machine interface, the search processing unit 21 in the mobile terminal matches the inputted keyword based on information stored in the interest database unit 22, and obtains one or more keywords or key terms which are the most relevant. The higher the sum of the interests of a plurality of URLs associated with each keyword or each key term is, the higher the sequence recommended in the search suggestion list is. Since a plurality of keywords or key terms may be matched to the inputted keyword, the number of the keywords displayed and recommended in the search suggestion list can be set flexibly based on the display performance of the mobile terminal or the habits of the user.

Further, the interest database unit 22 further comprises: an interest list sub-unit 221 and a use log sub-unit 222;

the interest list sub-unit 221 is configured to store personal interest information and URLs and interests to which the personal interest information is mapped, and to be updated by the search processing unit 21;

specifically, since the structure of the interest list is a collection of keywords, URLs and interests, the interest list can be updated directly, based on the following specific method: performing the ranking based on the interests, selecting at least one keyword with a highest similarity to store the keyword and its URLs and interests in the interest list. The number of the selected keyword with the highest similarity can be set by the user based on personal use habits in combination with the performance of the mobile terminal.

The use log sub-unit 222 is configured to store a user ID, the keyword, the URLs associated with the keyword, dates on which the URLs are used, start time and end time associated with opening of the URLs.

Specifically, after the user completes operations such as clicking etc, the data in the use log list is updated based on the current operation of the user. The interest database is updated after each use to continually update and increase the data quantity in the interest database, thus the subsequent search results are more accurate and the recommended ranking can better meet the interest of the user.

To sum up, the disclosure is applicable to mobile terminals which are more user-targeted and can be realized on the mobile terminals with operation systems which provide external interfaces for connecting Internet search engines. A preferred scheme is to use mobile terminals of the Android system.

The above are only the preferred embodiments of the disclosure and not intended to limit the scope of protection of the disclosure, and any modifications, equivalent replacements, improvements and the like within the spirit and principle of the invention shall fall within the scope of protection of the disclosure.

What is claimed is:

1. A personalized meta-search method, comprising:
   preestablishing an interest database, and further comprising:
   searching, by a mobile terminal, a keyword;
   extracting, by the mobile terminal, a use log of the keyword from the interest database;
   preprocessing, by the mobile terminal, search results returned from a search engine;
   calculating, by the mobile terminal, by using the use log, interests of the preprocessed search results and of Uniform Resource Locators (URLs) in the interest database corresponding to the searched keyword;
   ranking, by the mobile terminal, based on calculated results, and displaying the preprocessed search results and the URLs; and
   updating the interest database,
   wherein the interest database comprises: an interest list and a use log list, wherein
      the interest list comprises: the keyword, the URLs associated with the keyword, and interests corresponding to the URLs;
      the use log list comprises: a user identity, the keyword, the URLs associated with the keyword, dates on which the URLs are used, start time and end time associated with opening of the URLs;
   the updating the interest database comprises at least one of: performing, by the mobile terminal, the ranking based on the calculated interests, selecting at least one keyword with a highest similarity to store the keyword and its URLs and interest in the interest database, and updating data in the use log according to operations of the user.

2. The method according to claim 1, further comprising:
before searching the keyword,
when a user inputs the keyword, obtaining, by using an interest database, and presenting a ranked search suggestion list to the user.

3. The method according to claim 2, wherein the preestablishing the interest database comprises: establishing the interest database based on interest information inputted by the user in connection with searched out related URLs.

4. The method according to claim 2, wherein parameters for interest calculation comprise at least one of:
inclusion of the searched keyword in keywords associated with the URLs;
location of the searched keyword in link of the URLs;
history times of clicking the URLs by users; history time periods for browsing the URLs by users; and
history clicking sequence of the URLs by users.

5. The method according to claim 1, wherein the preestablishing the interest database comprises: establishing the interest database based on interest information inputted by the user in connection with searched out related URLs.

6. The method according to claim 1, wherein parameters for interest calculation comprise at least one of:
inclusion of the searched keyword in keywords associated with the URLs;
location of the searched keyword in link of the URLs;
history times of clicking the URLs by users; history time periods for browsing the URLs by users; and
history clicking sequence of the URLs by users.

7. A mobile terminal for personalized meta-search, comprising: a search processing unit, an interest database unit, an interface unit, and an interest database initial setting unit; wherein
the search processing unit of the mobile terminal, is configured to extract a use log of a searched keyword from the interest database unit, to obtain search results from the interface unit and perform preprocessing, to calculate interests of the preprocessed search results and of the extracted URLs in the interest database corresponding to the searched keyword by using the use log, and to rank, based on the calculated results, and display the preprocessed search results and the extracted URLs;
the interest database unit of the mobile terminal, is configured to store the use log and personal interest information of users, and URLs and interests to which the personal interest information is mapped, and to be updatable by the search processing unit;
the interface unit of the mobile terminal, is configured to provide the search processing unit with an interface for connecting to a search engine and obtaining search results; and
the interest database initial setting unit of the mobile terminal, is configured to store interest database information into the interest database unit,
wherein the interest database unit of the mobile terminal, further comprises: an interest list sub-unit and a use log sub-unit; wherein
the interest list sub-unit is configured to store personal interest information and URLs and interests to which the personal interest information is mapped and to be updatable by the search processing unit; and
the use log sub-unit is configured to store a user identity, the keyword, the URLs associated with the keyword, dates on which the URLs are used, start time and end time associated with opening of the URLs;
the search processing unit of the mobile terminal, is further configured to update the interest database comprises at least one of: the search processing unit is configured to perform the ranking based on the calculated interests, and select at least one keyword with a highest similarity to store the keyword and its URLs and interest in the interest database, and update data in the use log according to operations of the user.

8. The application terminal according to claim 7, wherein the search processing unit is further configured to obtain, by using data in the interest database, and display a ranked search suggestion list to the user, when the user inputs the keyword.

9. The application terminal according to claim 8, wherein parameters for calculating the interests by the search processing unit comprise at least one of:
inclusion of the searched keyword in keywords associated with the URLs;
location of the searched keyword in link of the URLs;
history times of clicking the URLs by users; history time periods for browsing the URLs by users; and
history clicking sequence of the URLs by users.

10. The application terminal according to claim 7, wherein parameters for calculating the interests by the search processing unit comprise at least one of:
inclusion of the searched keyword in keywords associated with the URLs;
location of the searched keyword in link of the URLs;
history times of clicking the URLs by users; history time periods for browsing the URLs by users; and
history clicking sequence of the URLs by users.

* * * * *